J. W. TRUBY.

Corner-Sockets for Show-Cases.

No. 5,748. Reissued Jan. 27, 1874.

Witnesses
J. H. Sherburne
James Coleman

Inventor
John W. Truby
By Sherburne & Co.
his Attorneys.

AM. PHOTO-LITHOGRAPHIC Co. N.Y. (OSBORNE'S PROCESS)

UNITED STATES PATENT OFFICE.

JOHN W. TRUBY, OF CHICAGO, ILLINOIS, ASSIGNOR TO MATTHIAS TERHUNE, OF SAME PLACE.

IMPROVEMENT IN CORNER-SOCKETS FOR SHOW-CASES.

Specification forming part of Letters Patent No. 117,831, dated August 8, 1871; reissue No. 5,748, dated January 27, 1874; application filed December 1, 1873.

*To all whom it may concern:*

Be it known that I, JOHN W. TRUBY, of Chicago, in the county of Cook and State of Illinois, have invented a new and useful Improvement in Corner-Pieces for Show-Cases; and I do hereby declare the following to be a full, clear, and exact description thereof, which will enable others skilled in the art to which my invention appertains to make and use the same, reference being had to the accompanying drawing forming part of this specification, in which—

Figure 1:
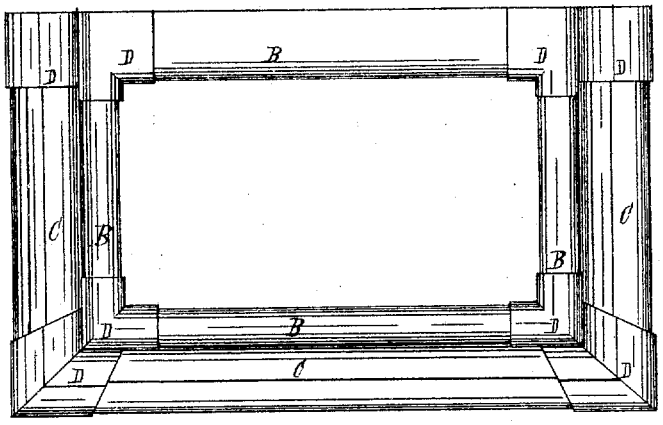
Figure 2:
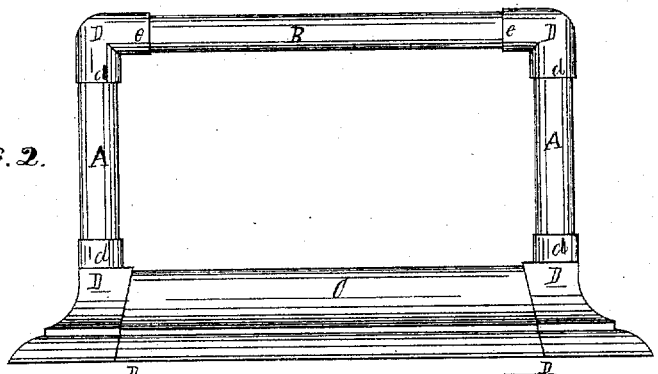
Figure 3:
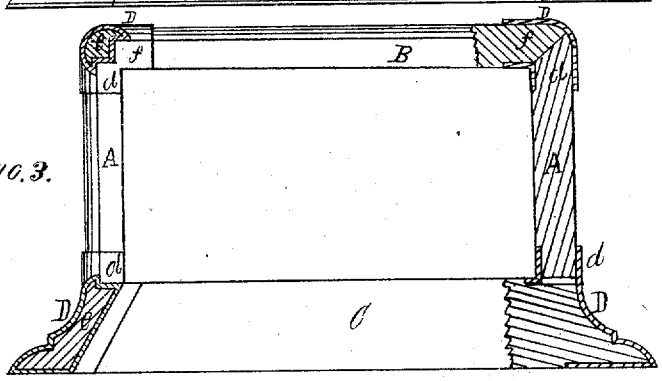

Figure 1 is a general plan or top view of a show-case embodying my said invention. Fig. 2 is a side elevation of the same; and Fig. 3 is a vertical longitudinal section cutting one of the uprights through the center, showing the manner of connecting the ends of the different members of the frame within the corner-pieces.

Similar letters of reference indicate like parts in the several figures of the drawing.

My invention has for its object to provide a means for connecting the ends of the horizontal and vertical members of a show-case frame; and to that end it consists in a metallic corner-piece, provided with sockets adapted to receive the ends of the different members, whereby the same are firmly connected at the corners of the case.

In the drawing, A is the vertical members, and B C the horizontal members, of the frame-work; but as the same constitute no part of the present invention, a description thereof is not necessary to be herein particularly given. D is a corner-piece, which may be made of any suitable metal. These corner-pieces are provided with sockets *d*, *e*, and *f*, which are so arranged as to receive the ends of the different members A, B, and C of the frame, socket *d* receiving the vertical member, and sockets *e* and *f* receiving the horizontal members. The walls of these sockets are shaped approximating the form of the molding on the member to be used, and are so arranged as to closely fit the same.

The corner-pieces used in connecting the corners of the upper portion or members of the case are made to correspond with the molding used, and are inverted, by which means the upper ends of the vertical members are inserted within socket *d* of the same.

Show-cases have been heretofore manufactured by dovetailing, mortising, or gluing the corners together; but with such connections the corners are more or less liable to break apart, while, with my invention, this difficulty is entirely overcome, as the corner-pieces hold the corners firmly together, making a more durable frame-work.

Having thus described my invention, I claim—

The metallic corner-piece D, provided with the sockets *d*, *e*, and *f*, adapted to receive the members A, B, and C of a show-case frame, as specified.

The above specification of my invention signed by me this 29th day of August, 1873.

JOHN W. TRUBY.

Witnesses:
N. H. SHERBURNE,
JAMES COLEMAN.